US010144380B2

(12) United States Patent
Laskey et al.

(10) Patent No.: US 10,144,380 B2
(45) Date of Patent: Dec. 4, 2018

(54) METHOD AND APPARATUS FOR PROVIDING ROAD AND VEHICLE CONDITION DIAGNOSTICS

(71) Applicant: Dana Heavy Vehicle Systems Group, LLC, Maumee, OH (US)

(72) Inventors: Ryan W. Laskey, Lambertville, MI (US); Douglas D. Turner, Holland, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 15/471,906

(22) Filed: Mar. 28, 2017

(65) Prior Publication Data
US 2017/0274855 A1 Sep. 28, 2017

Related U.S. Application Data

(60) Provisional application No. 62/313,896, filed on Mar. 28, 2016.

(51) Int. Cl.
*G07C 5/00* (2006.01)
*G07C 5/02* (2006.01)
(Continued)

(52) U.S. Cl.
CPC .......... *B60R 21/0132* (2013.01); *B60B 35/14* (2013.01); *B60B 35/16* (2013.01);
(Continued)

(58) Field of Classification Search
CPC ...... B60R 21/0132; B60R 2021/02013; B60R 2021/01304; G07C 5/008; G01C 21/28;
(Continued)

(56) References Cited

U.S. PATENT DOCUMENTS 4,148,027 A 4/1979 Nowogrodzki
6,484,089 B1 11/2002 Millington
(Continued)

OTHER PUBLICATIONS

R.J. Thompson et al.; "The development of a real-time mine road maintenance management system using haul truck and road vibration signature analysis"; Journal of the South African Inst. of Mining and Metallurgy; Jun. 2003; pp. 265-272 (Year: 2003).*
Euopean Patent Office, Search Report with Written Opinion issued with Application EP 17163376.1, dated Aug. 22, 2017, 10 pages, European Patent Office, Hague, Netherlands.

*Primary Examiner* — Michael J Zanelli
(74) *Attorney, Agent, or Firm* — Marshall & Melhorn, LLC

(57) ABSTRACT

A method of providing road and vehicle diagnostics, includes providing a vehicle axle system having a first axle half shaft housing, a second axle half shaft housing and a differential housing. Attached to one or more of the housings is one or more tri-axis accelerometers. In communication with the accelerometers is one or more data processors configured to receive and analyze data from the accelerometers. An occurrence of one or more road events is determined by one or more spikes in the Z-direction of the data collected from the accelerometers. A depth of the road event is determined by a magnitude of the positive and negative changes in acceleration of the spike in the Z-direction and a length of road event is determined by an amount of time between two spikes of opposite magnitudes in said Z-direction. Once identified, the time and geographic location of the road event is identified.

13 Claims, 7 Drawing Sheets

(51) Int. Cl.
*G08G 1/01* (2006.01)
*B60B 35/14* (2006.01)
*B60B 35/16* (2006.01)
*B60K 17/16* (2006.01)
*B60K 17/36* (2006.01)
*G01C 21/16* (2006.01)
*G01C 21/28* (2006.01)
*G01P 15/18* (2013.01)
*B60R 21/0132* (2006.01)
*B60W 40/107* (2012.01)
*B60W 40/109* (2012.01)
*G07C 5/08* (2006.01)
*B60R 21/01* (2006.01)
*B60R 21/013* (2006.01)
*B60S 1/04* (2006.01)

(52) U.S. Cl.
CPC ............ *B60K 17/165* (2013.01); *B60K 17/36* (2013.01); *B60W 40/107* (2013.01); *B60W 40/109* (2013.01); *G01C 21/16* (2013.01); *G01C 21/28* (2013.01); *G01P 15/18* (2013.01); *G07C 5/008* (2013.01); *G07C 5/02* (2013.01); *G07C 5/0808* (2013.01); *G08G 1/0112* (2013.01); *G08G 1/0129* (2013.01); *G08G 1/0133* (2013.01); *G08G 1/0141* (2013.01); *B60R 2021/01013* (2013.01); *B60R 2021/01088* (2013.01); *B60R 2021/01304* (2013.01); *B60S 1/0491* (2013.01)

(58) Field of Classification Search
CPC ...... G08G 1/0133; G01P 15/18; B60W 40/04; B60W 40/06
See application file for complete search history.

(56) References Cited

U.S. PATENT DOCUMENTS

| | | | |
|---|---|---|---|
| 7,421,334 B2 | 9/2008 | Dahlgren et al. | |
| 8,548,669 B2* | 10/2013 | Naylor | G06Q 10/04 |
| | | | 701/29.1 |
| 8,706,378 B2 | 4/2014 | Choby | |
| 9,109,913 B2 | 8/2015 | Lu et al. | |
| 9,361,794 B1 | 6/2016 | Lynch | |
| 9,626,763 B1* | 4/2017 | Hoye | G06T 7/0042 |
| 9,815,475 B2* | 11/2017 | Spata | B60W 40/06 |
| 2004/0107042 A1* | 6/2004 | Seick | G08G 1/0104 |
| | | | 701/117 |
| 2009/0160675 A1 | 1/2009 | Piccinini et al. | |
| 2012/0053805 A1 | 3/2012 | Dantu | |
| 2014/0160295 A1* | 6/2014 | Kyomitsu | G08G 1/0112 |
| | | | 348/159 |
| 2014/0330526 A1* | 11/2014 | Allen | G01M 5/0025 |
| | | | 702/34 |
| 2014/0355839 A1 | 12/2014 | Bridgers et al. | |
| 2016/0358081 A1 | 12/2016 | Cama et al. | |

* cited by examiner

METHOD AND APPARATUS FOR PROVIDING ROAD AND VEHICLE CONDITION DIAGNOSTICS

CROSS-REFERENCE TO RELATED APPLICATIONS

The present application claims the benefit to U.S. Provisional Patent Application No. 62/313,896 filed on Mar. 28, 2016, which is incorporated herein by reference in its entirety.

FIELD OF THE DISCLOSURE

The present disclosure relates to a smart driveline for a vehicle that provides road condition and vehicle condition diagnostics.

BACKGROUND TO THE DISCLOSURE

It is well known and understood that commercial vehicles spend a large amount of time on the roads. As a result of the large amount of time these vehicles spend on the roads, the vehicles, and their drivers, become valuable sources of information regarding the condition of various segments of roads. These vehicles can provide information relating to road conditions, such as but not limited to, how rough or smooth the road(s) are, how hilly the road(s) are, how curved or straight the road(s) are, how many potholes are in the road(s), as well as other conditions. Additionally, the vehicles can provide information in relation to the amount of traffic on a given segment of road and how quickly or slowly the traffic is moving on a given segment of road.

Owners and/or operators of commercial vehicles find all of this information valuable as they want to find the quickest and safest route possible to deliver their cargo. A quick and safe route ensures that the vehicle and the vehicle operator experience a minimum of wear and tear, it enables the vehicle and the vehicle operator to take additional loads, it reduces fuel costs and increases the level of safety associated with the endeavor.

In most cases, the above-mentioned road condition information is not shared among vehicle owners and/or vehicle operators. It would therefore be advantageous to share this information, particularly on a real-time basis, with third parties, governmental entities and/or the public so that efficient routes can be planned, fuel costs can be reduces, and information about the condition of various segments of roads can be shared so they can be repaired as needed.

SUMMARY OF THE DISCLOSURE

A method of providing road and vehicle diagnostics. The method includes providing a vehicle axle system having a first axle half shaft housing, a second axle half shaft housing and a differential housing. Attached to one or more of the housings is one or more tri-axis accelerometers. In communication with the accelerometers is one or more data processors operably configured to receive and analyze data from the accelerometers. An occurrence of one or more road events is determined by a spike in the Z-direction of the data collected from the accelerometers. A depth of the road event is determined by a magnitude of the positive and negative changes in acceleration of the spike in the Z-direction and a length of road event can be determined by an amount of time between two spikes of opposite magnitudes in said Z-direction. Once the road event is identified, the time and geographic location of the road event is identified.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It is within the scope of this disclosure, and as a non-limiting example, that the method and apparatus for providing road and vehicle condition diagnostics disclosed herein may be used in automotive, off-road vehicle, all-terrain vehicle, construction, structural, marine, aerospace, locomotive, military, machinery, robotic and/or consumer product applications. Additionally, as a non-limiting example, the method and apparatus for providing road and vehicle condition diagnostics disclosed herein may also be used in passenger vehicle, electric vehicle, hybrid vehicle, commercial vehicle, autonomous vehicles, semi-autonomous vehicles and/or heavy vehicle applications.

Figure 1:
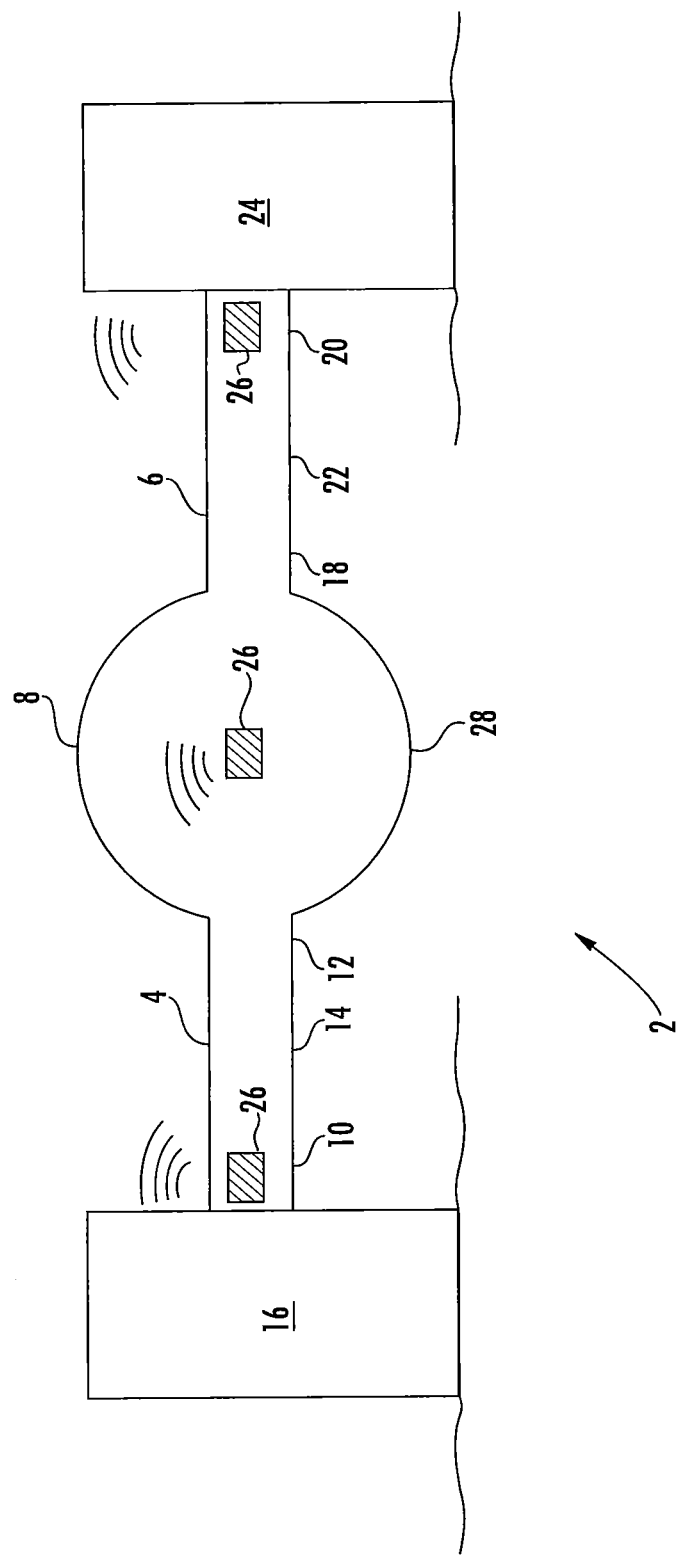
FIG. 1 is a schematic front-view of a vehicle axle system according to an embodiment of the disclosure.

FIG. 1 is a schematic front-view of a vehicle axle system according to an embodiment of the disclosure. A vehicle axle system 2 having a first axle half shaft housing 4, a second axle half shaft housing 6 and a differential housing 8. As a non-limiting example, axle system may be a front axle system, a rear axle system, a forward tandem axle system and/or a rear tandem axle system.

As illustrated in FIG. 1 of the disclosure, the first axle half shaft housing 2 of the vehicle axle system 2 has a first end portion 10, a second end portion 12 and an outer surface 14. At least a portion of the first end portion 12 of the first axle half shaft housing 4 is connected to a wheel assembly 16. Additionally, at least a portion of the second end portion 12 of the first axle half shaft housing is 4 is connected to an end of the differential housing 8 opposite the second axle half shaft housing. According to an embodiment of the disclosure and as anon-limiting example, the second end portion 12 of the first axle half shaft housing 4 may be integrally formed as part of the differential housing of the vehicle axle system 2. In accordance with an alternative embodiment of the disclosure, the second end portion 12 of the first axle housing 4 may be connected to the differential housing 8 by using one or more welds, a threaded connection and/or one or more mechanical fasteners.

As illustrated in FIG. 1, the second axle half shaft housing 6 has a first end portion 18, a second end portion 20 and an outer surface 22. At least a portion of the second end portion 20 of the axle half shaft housing 6 is connected to a second wheel assembly 24. Additionally, as illustrated in FIG. 1 of the disclosure, at least a portion of the first end portion 18 of the second axle half shaft housing 6 is connected to an end of the differential housing 8 opposite the second end portion 12 of the first axle half shaft housing 4. According to an embodiment of the disclosure and as anon-limiting example, the first end portion 18 of the second axle half shaft housing 6 may be integrally formed as part of the differential housing of the vehicle axle system 2. In accordance with an alternative embodiment of the disclosure, the first end portion 18 of the second axle housing 6 may be connected to the differential housing 8 by using one or more welds, a threaded connection and/or one or more mechanical fasteners.

Integrally connected to at least a portion of the vehicle axle system 2 is one or more sensors 26. As illustrated in FIG. 1 of the disclosure, the one or more sensors 26 are integrally connected to at least a portion of the outer surface of the first axle half shaft housing 4, an outer surface 28 of the differential housing 8 and/or the outer surface 22 of the second axle half shaft housing 6 of the vehicle axle system 2. By locating the one or more sensors 26 on the first axle half shaft housing, the second axle half shaft housing and/or the differential housing, it allows the one or more sensors 26 to more accurately collect road condition data as it is transferred from the wheels 16 and 24 to the vehicle axle system 2. More particularly, the one or more sensors 26 on the first axle half shaft housing 4 are integrally connected to at least a portion of the outer surface 14 of the first end portion 10 of the first axle half shaft housing 4. Additionally, more particularly, the one or more sensors 26 on the second axle half shaft housing 6 are integrally connected to at least a portion of the outer surface 22 of the second end portion 20 of the second axle half shaft housing 6. It is within the scope of this disclosure that the one or more sensors 26 are integrally connected to the first axle half shaft housing 4, the second axle half shaft housing 6 and/or the differential case 8 by using one or more welds, one or more adhesives and/or one or more mechanical fasteners. As a non-limiting example, the one or more sensors 26 are one or more accelerometers or tri-axis accelerometers that are capable of measuring acceleration in the X, Y and Z directions.

Figure 2:
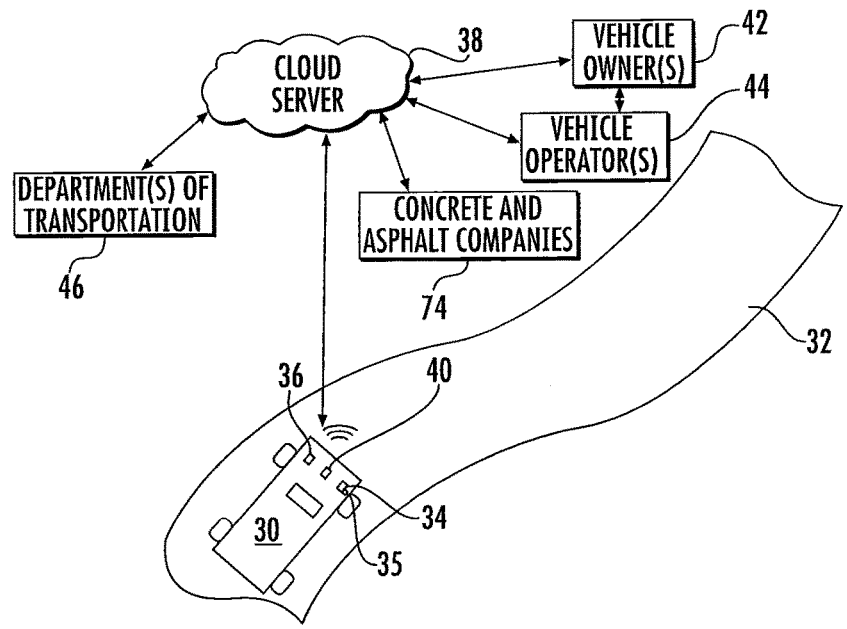
FIG. 2 is a schematic top-plan view of a vehicle having one or more of the vehicle axle systems illustrated in FIG. 1 driving on a stretch of road.
Figure 2A:
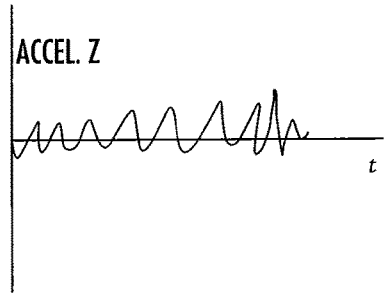
FIG. 2A is a plot illustrating the roughness or smoothness of the segment of road illustrated in FIG. 2 as measured by the vehicle axle system illustrated in FIG. 1.
Figure 2B:
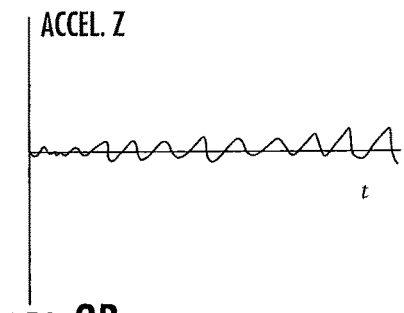
FIG. 2B is a plot illustrating a segment of road that is classified using vehicle axle system illustrated in FIG. 1 according to an embodiment of the disclosure.
Figure 2C:
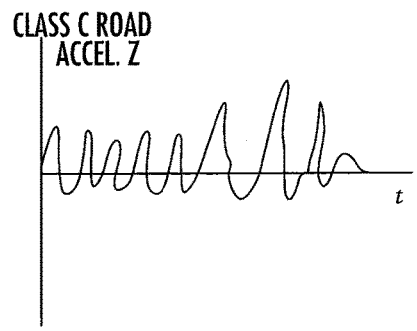
FIG. 2C is a plot illustrating a segment of road that is classified using vehicle axle system illustrated in FIG. 1 according to an embodiment of the disclosure.

As illustrated in FIGS. 1-2C of the disclosure, as one or more vehicles 30 having one or more vehicle axle systems 2 drive across one or more segments of road 32, the one or more sensors 26 collect data. As a non-limiting example, the one or more vehicles 30 may be a passenger vehicle, heavy vehicle, commercial vehicle, autonomous vehicle, semi-autonomous vehicle, hybrid vehicles, electric vehicles, hybrid electric vehicles or motor cycle. When the one or more vehicles 30 drives across the one or more segments of road 32 the one or more sensors 26 continuously measure the changes in acceleration in the Z-direction. In accordance with this embodiment of the disclosure, when the one or more sensors 26 measure the changes in acceleration in the Z-direction, they are measuring the amount and degree of motion in the up and down direction. The one or more sensors 26 then continuously transmit the measured changes in acceleration to an onboard computer 34 of the one or more vehicles 30. The onboard computer 34 has one or more data processors 35 for analyzing the data collected by the one or more sensors 26. As a non-limiting example, the one or more sensors 26 may transmit the changes in acceleration measured by using a wired connection or a wireless connection, such as but not limited to, a Wi-Fi connection, a Bluetooth connection and/or an electromagnetic wave connection.

The onboard computer 34 of the one or more vehicles 30 then monitors the changes in acceleration in the Z-direction measured by the one or more sensors 26 over a period of time t. FIG. 2A of the disclosure graphically depicts the changes in acceleration in the Z-direction measured by the one or more sensors 26 on the vehicle axle system 2 over a period of time t. It is within the scope of the disclosure that the plot generated in FIG. 2A may be based on the changes in acceleration in the Z-direction measured by the one or more sensors 26 located on the first axle half shaft housing 4, the second axle half shaft housing 6 and/or the differential housing 8. In accordance with this embodiment of the disclosure, the changes in acceleration over time determined by the one or more data processors 35 of the onboard computer 34 may be an average of the data measured by the one or more sensors 26 on the first axle half shaft housing 4, the second axle half shaft housing 6 and/or the differential housing 8 over a pre-determined period of time t.

An onboard Global Positioning System (GPS) 36 onboard the one or more vehicles 30 is in communication with the one or more sensors 26 and/or the onboard computer 34 of the one or more vehicles 30. The GPS 36 is used to identify the geographic location of the changes in acceleration in the Z-direction measured by the one or more sensors 26 over a per-determined period of time t. As a result, the one or more vehicles 30 is able to determine the amount or magnitude of changes in acceleration in the Z-direction for given segment(s) of road 32.

According to an embodiment of the disclosure and as a non-limiting example, the onboard computer 34 of the one or more vehicles 30 is then able to classify segment(s) of road 32 based on how smooth and/or rough the one or more segments of road 32 are at a given time. In accordance with an embodiment of the disclosure and as a non-limiting example, the segments of road may be classified as A, B or C based on how smooth and/or rough the one or more segments of road 32 are. As illustrated in FIG. 2B of the disclosure, when the changes in acceleration in the Z-direction measured by the one or more sensors 26 of the one or more vehicles 30 are of a relatively low frequency and magnitude, that segment of road may be given a Class A designation. The Class A designation indicates that the segment of road is relatively smooth and/or in a good condition. On the other hand, as illustrated in FIG. 2C of the disclosure, when the changes in acceleration in the Z-direction measured by the one or more sensors 26 of the one or more vehicles 30 are of a relatively high frequency and magnitude, that segment of road may be given a Class C designation. The Class C designation indicates that the segment of road is not smooth and/or is not in a good condition and requires immediate maintenance. As Class B segment of road is a segment of road will be somewhere between a Class A and a Class C segment of road. The class B designation indicates that the segment of road is relatively smooth and/or will require maintenance in the near future.

The data collected and analyzed by the one or more data processors 35 of the onboard computer 34 of the one or more vehicles 30 classifying the one or more segments of road 32 traveled is then continuously communicated, or communicated at pre-determined times throughout the day, to a cloud-based server 38 by using a telemetric system 40 within the one or more vehicles 30. As a non-limiting example, the onboard telemetric system 40 of the one or more vehicles 30 may communicate with the cloud-based server 38 by using a Bluetooth connection, Wi-Fi connection, electromagnetic wave connection, cellular connection, a radio connection, a wired connection and/or an optical connection. It is within the scope of this disclosure that the one or more data processors 35 may to convert the data collected to the minimum set of data required for further analysis prior to being transmitted by the telemetric system 40. By minimizing the amount of data transmitted by the telemetric system 40, communications costs are reduced.

In accordance with an alternative embodiment of the disclosure, the data collected and analyzed by the one or more data processors 35 of the onboard computer 34 of the one or more vehicles 30 classifying the one or more segments of road 32 traveled may be uploaded to the cloud-based server 38 when the one or more vehicles 30 return to a home base. As a non-limiting example, the onboard telemetric system 40 of the one or more vehicles 30 may communicate with the cloud-based server 38 by using a Bluetooth connection, Wi-Fi connection, electromagnetic wave connection, cellular connection, a radio connection, a wired connection and/or an optical connection.

Once the cloud-based server 38 receives the data collected and analyzed by the one or more data processors 35 of the onboard computer 34 of the one or more vehicles 30, the data may be further statistically analyzed across each of the one or more segments of road 32 by the one or more vehicles 30. This will provide a more accurate classification for each segment of road.

Vehicle owner(s) 42 and/or vehicle operator(s) 44 may access the road classification information stored and/or analyzed within cloud-based server 38 to make informed decisions about the routes to be traveled by the one or more vehicles 30. The more rough the segment of road is, the more wear and tear that is exerted onto the one or more vehicles 30 and the vehicle operator(s) 44. As a result, the more rough the segments of roads are that the one or more vehicles 30 are traveling, the more frequently the one or more vehicles 30 need to go in for repair which costs the vehicle owner(s) 42 and/or the vehicle operator(s) 44 time and money. By choosing travel routes for the one or more vehicles 30 that are relatively smooth or have fewer Class C ratings, the vehicle owner(s) 42 and/or vehicle operator(s) 44 can increase the time between vehicle maintenance periods.

In addition, one or more departments of transportation 46 may access the road classification information stored and/or analyzed within the cloud-based server 38 to determine which of the one or more segments of road 32 are in need of repair. Based on the road classification information contained within the cloud based server 38, the one or more departments of transportation 46 can identify which of the one or more segments of road 32 are in immediate need of repair and which of the one or more segments of road 32 will need repairs in the near future. This will allow the one or more departments of transportation 46 to make a more effective and more efficient road maintenance schedule.

Figure 3:
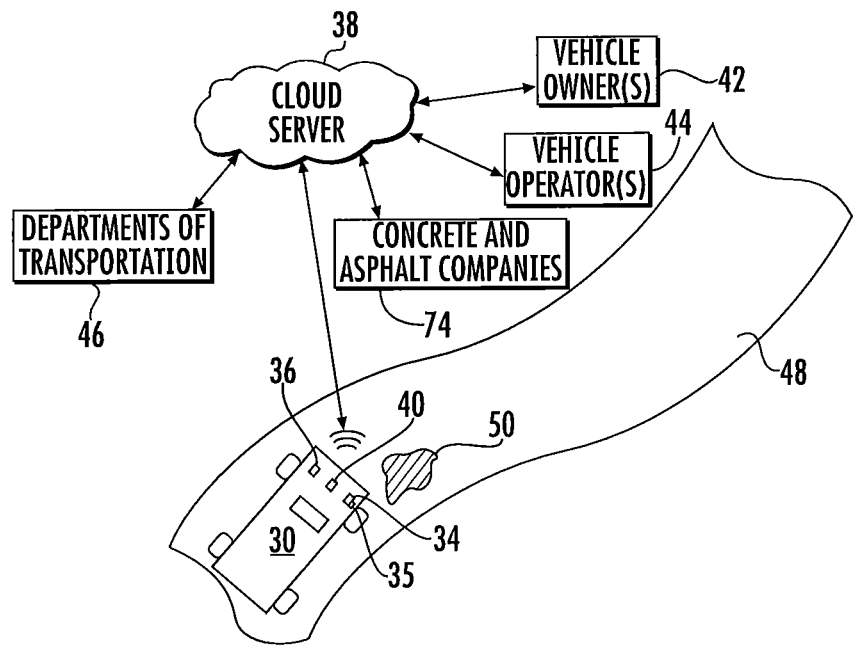
FIG. 3 is a schematic top-plan view of a vehicle having one or more of the vehicle axle systems illustrated in FIG. 1 driving on a stretch of road.

FIG. 3 illustrates the one or more vehicles 30 having one or more vehicle axle systems 2. As the one or more vehicles 30 drive across one or more segments of road 48, the one or more sensors 26 continuously collect data. When the one or more vehicles 30 experiences one or more road events 50, the one or more sensors 26 of the one or more vehicles 30 measure a spike in the Z-direction. As a non-limiting example, the one or more road events 50 may be a pothole, sinkhole, bumps, debris, a crack and/or any other type of road damage.

Figure 3A:
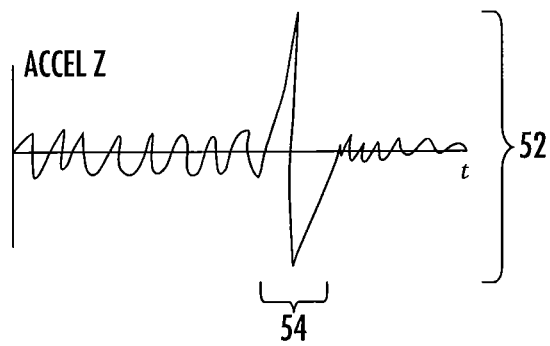
FIG. 3A is a plot illustrating the existence of a road condition on the segment of road illustrated in FIG. 3 as measured by the vehicle axle system illustrated in FIG. 1.
Figure 3B:
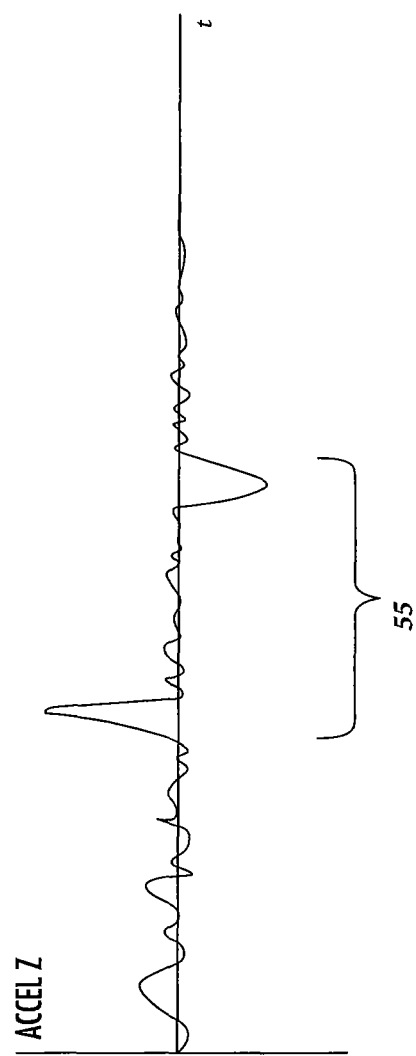
FIG. 3B is a plot illustrating existence of a road condition on the segment of road illustrated in FIG. 3 as measured by the vehicle axle system illustrated in FIG. 1 according to an alternative embodiment of the disclosure.

The one or more data processors 35 of the onboard computer 34 of the one or more vehicles 30 then analyzes the spike in the Z-direction over a period of time t. FIG. 3A of the disclosure graphically depicts a spike in the Z-direction experienced by the one or more vehicles 30 after encountering one or more road events 50 over a period of time t. Based on the spike in the Z-direction measured by the one or more sensors 26 the onboard computer 34 of the vehicle 30 can determine the depth and/or the length of the one or more road events 50 encountered by the one or more vehicles 30. As illustrated in FIG. 3A, the magnitude of the positive and/or negative changes in acceleration 52 measured by the one or more sensors 26 determines the depth of the one or more road events 50 experienced by the one or more vehicles 30. The greater magnitude 52 the deeper the one or more road events 50 are and the smaller the magnitude 52 is the shallower the one or more road events 50 are. Additionally, as illustrated in FIG. 3A, the span 54 of the spike in the Z-direction measured by the one or more sensors 26 determines the length of the one or more road events 50 experienced by the one or more vehicles 30. Furthermore, as illustrated in FIG. 3B of the disclosure, the one or more road events 50 may be of such length that the one or more road events 50 generate a first spike in the Z-direction as the one or more vehicles 30 enter the road event 50. While in the one or more road events 50, the acceleration measured by the one or more sensors 26 stabilizes within span 55. When the one or more vehicles 30 exit the one or more road events 50, the one or more sensors 26 of measure a second spike in the Z-direction, of an opposite magnitude, as the one or more vehicles 30 exit the one or more road events 50. The greater the span 54 or the span 55 between the spikes in the Z-direction, the longer the amount of time t the one or more vehicles 30 experienced the one or more road events 50, therefore the larger the width of the one or more road events 50. Furthermore, the smaller the span 54, the shorter the amount of time t the one or more vehicles 30 experienced the one or more road events 50, therefore the smaller the width of the one or more road events 50.

It is within the scope of the disclosure that the plot generated in FIGS. 3A and 3B may be based on the changes in acceleration in the Z-direction measured by the one or more sensors 26 located on the first axle half shaft housing 4, the second axle half shaft housing 6 and/or the differential housing 8. In accordance with this embodiment of the disclosure, the changes in acceleration over time determined by the one or more data processors 35 of the onboard computer 34 may be an average of the data measured by the one or more sensors 26 on the first axle half shaft housing 4, the second axle half shaft housing 6 and/or the differential housing 8 over a pre-determined period of time t.

According to an embodiment of the disclosure, the onboard GPS 36 of the one or more vehicles 30 may be used to identify the geographic location of the one or more road events 50 experience by the one or more vehicles 30.

The data collected and analyzed by the onboard computer 34 in relation to the occurrence of the one or more road events 50, along with the depth and length of the road event 50, is then continuously communicated, or communicated at pre-determined times throughout the day, to the cloud-based server 38 by using the telemetric system 40 within the one or more vehicles 30. As previously discussed, the onboard telemetric system 40 of the one or more vehicles 30 may communicate with the cloud-based server 38 by using a Bluetooth connection, Wi-Fi connection, electromagnetic wave connection, cellular connection, a radio connection, a wired connection and/or an optical connection.

In accordance with an embodiment of the disclosure, the data collected by the onboard computer 34 of the one or more vehicles 30 identifying the location, depth and/or length of the one or more road events 50 may be uploaded to the cloud-based server 38 when the one or more vehicles 30 return to a home base. As a non-limiting example, the onboard telemetric system 40 of the one or more vehicles 30 may communicate with the cloud-based server 38 by using a Bluetooth connection, Wi-Fi connection, electromagnetic wave connection, cellular connection, a radio connection, a wired connection and/or an optical connection.

Once the cloud-based server 38 receives the data collected by the onboard computer 34 of the one or more vehicles 30, the data relating to the location, depth and/or length of the one or more road events 50 may be further analyzed averaging the depth and/or length of the one or more road events 50. Additionally, the cloud-based server 38 is able to track the growth of the one or more road events 50 over time based on the changes in depth and/or length measured by the one or more vehicles 30 experiencing the one or more road events 50.

The vehicle owner(s) 42 and/or vehicle operator(s) 44 may utilize the one or more road events 50 information stored and/or analyzed within cloud-based server 38 to make informed decisions about the routes to be traveled by the one or more vehicles 30. The deeper and/or longer the one or more road events 50 the more wear and tear that is exerted onto the one or more vehicles 30 and the vehicle operator(s) 44. By choosing travel routes for the one or more vehicles 30 that have little to no road events 50, the vehicle owner(s) 42 and/or vehicle operator(s) 44 can increase the time between vehicle maintenance periods. Additionally, choosing travel routes with little to no road events 50, increases the overall amount of safety for the one or more vehicles 30 and the vehicle operator(s) 44 as each road event 50 increases the probability of harm to the one or more vehicles 30 and the vehicle operator(s) 44.

In addition, the one or more departments of transportation 46 may access the information relating to the one or more road events 50 stored and/or analyzed within the cloud-based server 38 to determine which of the one or more road events 50 are in need of repair. Based on the information contained within the cloud based server 38 about the one or more road events 50, the one or more departments of transportation 46 can identify which of the one or more road events 50 are in immediate need of repair and which of the one or more road events 50 will need repairs in the near future. This will allow the one or more departments of transportation 46 to make a more effective and more efficient road maintenance schedule.

Figure 4:
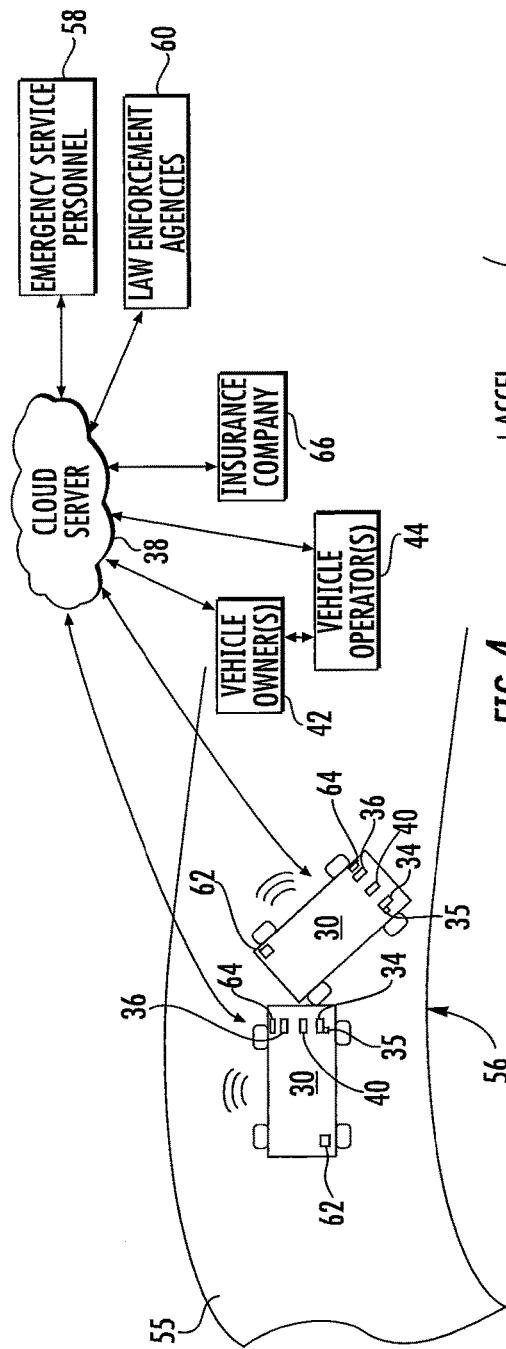
FIG. 4 is a schematic top-plan view illustrating one or more vehicles having the vehicle axle system illustrated in FIG. 1 driving on a segment of road.
Figure 4A:
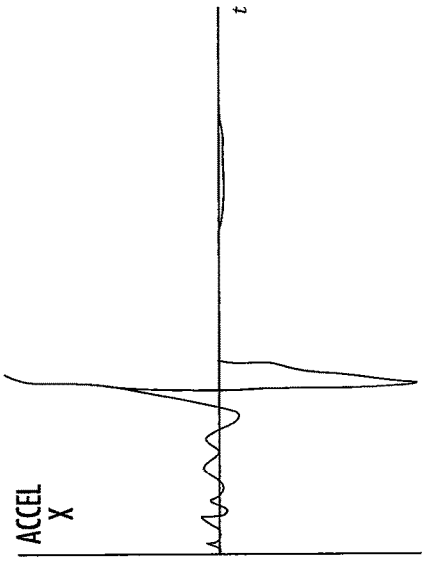
FIG. 4A is a plot illustrating the existence of a crash condition on the segment of road illustrated in FIG. 4 as measured by the vehicle axle system illustrated in FIG. 1.

FIG. 4 illustrates the one or more vehicles 30 having one or more vehicle axle systems 2. As the one or more vehicles 30 drive across a segment of road 55, the one or more sensors 26 continuously collect data. As illustrated in FIG. 4A of the disclosure, when the one or more vehicles 30 experience a crash condition 56, the one or more sensors 26 measure a spike in the X-direction, Y-direction and/or Z-direction. As a non-limiting example, a frontal or rear impact would result in a spike in the X-direction, a side impact would result in a spike in the Y-direction and a roll-over event would result in a spike in the Z-direction. The GPS 36 onboard the one or more vehicles 30, that is in communication with the one or more sensors 26 and/or the onboard computer 34, identifies the geographic location of the one or more vehicles 30 experiencing the crash condition 56.

When the onboard computer 34 of the one or more vehicles 30 determines the occurrence of the crash condition 56, the onboard telemetric system 40 of the one or more vehicles 30 communicates that information to the cloud-based server 38. As previously discussed, the onboard telemetric system 40 of the one or more vehicles 30 may communicate with the cloud-based server 38 by using a Bluetooth connection, Wi-Fi connection, electromagnetic wave connection, cellular connection, a radio connection, a wired connection and/or an optical connection.

Once the cloud-based server 38 receives the data collected by the onboard computer 34 of the one or more vehicles 30, the data relating to the crash condition 56 may be further analyzed to determine the number of vehicles that has experienced the crash condition 56 in the same geographic location.

The vehicle owner(s) 42 and/or vehicle operator(s) 44 may utilize the crash condition 56 information stored and/or analyzed within cloud-based server 38 to make informed decisions about the routes to be traveled by the one or more vehicles 30. By choosing travel routes without known crash conditions 56, the less time the one or more vehicles 30 spend on the road. Additionally, the vehicle owner(s) 42 and/or vehicle operator(s) 44 can utilize the crash condition 56 information to reroute the one or more vehicles 30 to avoid the crash condition 56 that has occurred in real-time.

In addition, emergency service personnel 58 may access the cloud-based server 38 to determine the occurrence of the crash condition 56, the geographical location of the crash condition 56 and how many vehicles have experienced the crash condition 56. If proper permissions are in place by the vehicle owner(s) 42 and vehicle operator(s) 44, the cloud-based server 38 could automatically notify emergency service personnel 58. This will allow despatchers of the emergency service personnel 58 to quickly and accurately determine the number of emergency service personnel 58 needed to be dispatched to the location of the crash condition

56. The more vehicles that have experienced the crash condition 56 within a pre-determined radius from each other will determine the number of emergency service personnel 58 need to be sent to the location of the crash condition 56 identified.

Furthermore, one or more law enforcement agencies 60 may access the cloud-based server 38 determine the occurrence of the crash condition 56, the geographical location of the crash condition 56 and how many vehicles have experienced the crash condition 56.

It is within the scope of this disclosure that the one or more vehicles 30 may further include on or more environmental data sensors 62 and one or more windshield wiper sensors 64. The one or more environmental data sensors 62 will continuously, at pre-determined times and/or upon the occurrence of a pre-determined event measure the ambient temperature the are or more vehicles 30 where in when the crash condition 56 occurred. If the windshield wipers are on at the time the crash condition 56 occurs, that will be a positive indication that there was some form of precipitation, such as but not limited to rain and/or snow, at the time the crash condition occurred. Additionally, the one or more windshield wiper sensors 64 will measure the speed of the windshield wipers. The faster the windshield wipers are moving the heavier the precipitation at the time of the crash condition 56. By leveraging the information from the one or more environmental sensors 62, the one or more windshield wiper sensors 64, the speed of the one or more vehicles 30, the location of the one or more vehicles 30 and the time of day the crash condition 56 occurred, the one or more data processors 35 of the onboard computer 34 can determine, through predictive modeling, the cause of the crash condition 56. As a non-limiting example, the cause of the crash condition 56 may be due to icy roads, black ice, frost, snow, rain, hydroplaning and/or low visibility.

It is within the scope of this disclosure that the telemetric system 40 of the one or more vehicles 30 may communicate the information collected and/or analyzed to predict the cause of the crash condition 56 to the cloud based server 38. Once received by the cloud-based server 38 the data relating to the prediction for the cause of the crash condition 56 may by further analyzed based on the information collected from the other vehicles that experienced the crash condition 56 within a pre-determined radius of each other. That additional information may be run through one or more additional predictive models to get a more accurate prediction of what caused the crash condition 56.

The one or more law enforcement agencies 60 and one or more insurance agencies 66 may access the crash condition prediction data from the cloud-based server 38 to aid in writing their reports of about the crash condition 56 that occurred.

Figure 5:
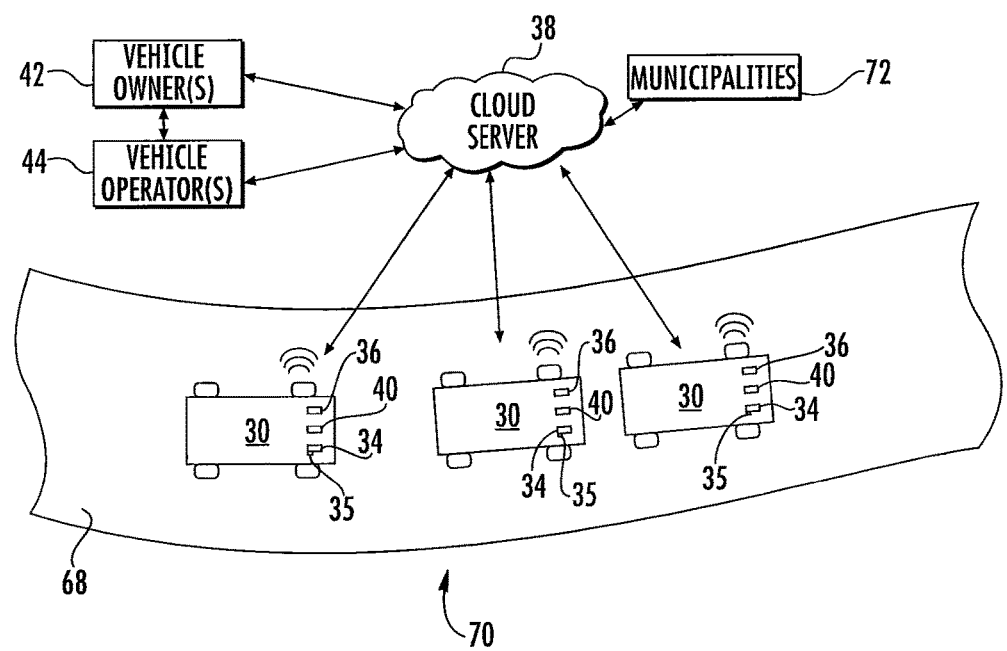
FIG. 5 is a schematic top-plan view illustrating one or more vehicles having the vehicle axle system illustrated in FIG. 1 driving on a segment of road.
Figure 5A:
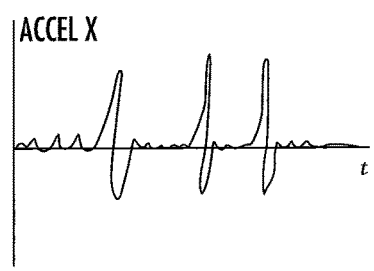
FIG. 5A is a plot illustrating the existence of traffic condition on the segment of road illustrated in FIG. 5 as measured by the vehicle axle system illustrated in FIG. 1.

FIG. 5 illustrates one or more vehicles 30 having one or more vehicle axle systems 2. As the one or more vehicles 30 drive across a segment of road 68, the one or more sensors 26 continuously collect data. As illustrated in FIG. 5A of the disclosure, when the one or more vehicles experience heavy or frequent braking indicating a traffic condition 70, the one or more sensors 26 measure a plurality of spiked in the X-direction over a pre-determined amount of time. The GPS 36 onboard the one or more vehicles 30, that is in communication with the one or more sensors 26 and/or the onboard computer 34, identifies the geographic location of the one or more vehicles 30 experiencing the traffic condition 70.

When the onboard computer 34 of the one or more vehicles 30 determines the occurrence of the traffic condition 70, the onboard telemetric system 40 of the one or more vehicles 30 communicates that information to the cloud-based server 38. As previously discussed, the onboard telemetric system 40 of the one or more vehicles 30 may communicate with the cloud-based server 38 by using a Bluetooth connection, Wi-Fi connection, electromagnetic wave connection, cellular connection, a radio connection, a wired connection and/or an optical connection.

Once the cloud-based server 38 receives the data collected by the onboard computer 34 of the one or more vehicles 30, the data relating to the traffic condition 70 may be further analyzed to determine the number of vehicles experiencing the traffic condition 70 and how long along the segment of road 68 the traffic condition 70 exists.

The vehicle owner(s) 42 and/or vehicle operator(s) 44 may utilize the traffic conditions 70 information stored and/or analyzed within cloud-based server 38 to make informed decisions about the routes to be traveled by the one or more vehicles 30. By choosing travel routes without known traffic conditions 70, the less time the one or more vehicles 30 spend on the road. Additionally, the vehicle owner(s) 42 and/or vehicle operator(s) 44 can utilize the traffic condition 70 information to reroute the one or more vehicles 30 to avoid the traffic condition 70 that has occurred in real-time. Furthermore, the emergency service personnel 58 and the one or more law enforcement agencies 60 may also utilize traffic condition 70 information to route services in the most efficient manner possible.

In addition, one or more municipalities 72 may access the data relating to the traffic conditions 70 experienced for a given geographic region to analyze and optimize traffic patterns. This will allow the municipalities 72 to manipulate and alter the traffic patterns within a given geographic region thereby optimizing the flow of traffic within that region.

Figure 6:
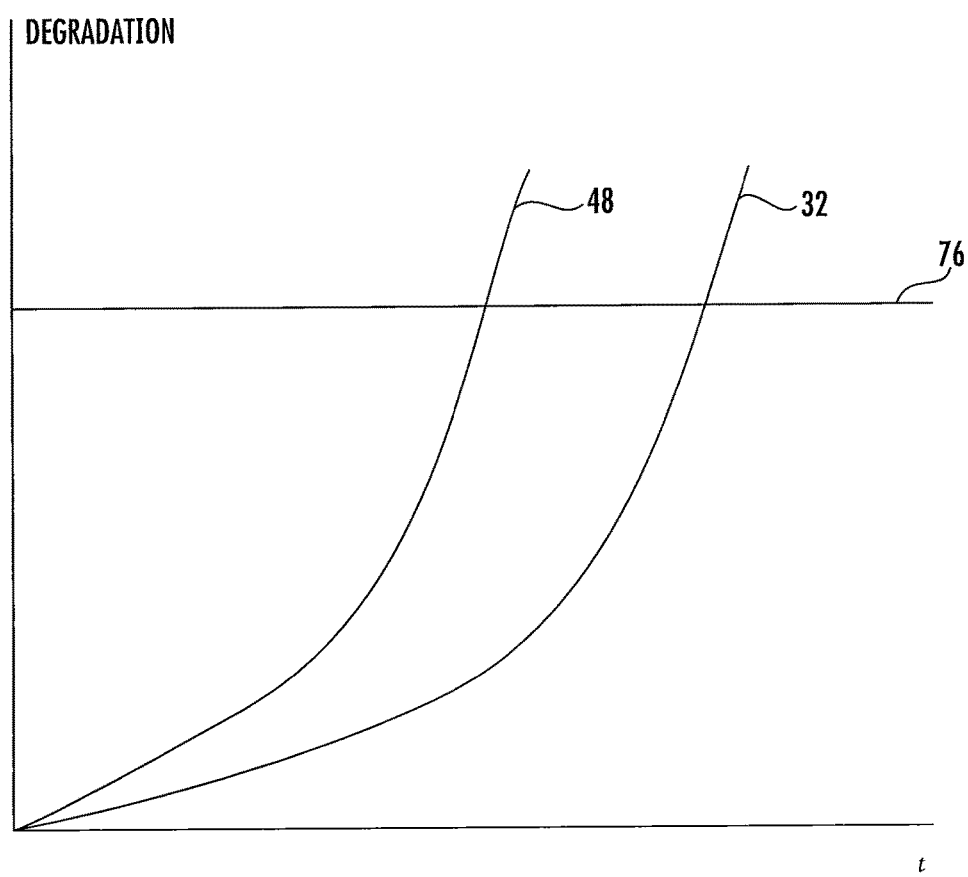
FIG. 6 is a plot illustrating a quality determination of materials for one or more segments of road according to an embodiment of the disclosure.

According to still a further embodiment of the disclosure, the data collected and/or analyzed by the cloud-based server 38 in relation to the one or more road events 50, the smoothness and/or the road roughness data analyzed by the one or more vehicles 30, may be accessed by one or more concrete and/or asphalt companies 74. As illustrated in FIGS. 2 and 3 of the disclosure, the one or more concrete and/or asphalt companies 74 can utilize this data to track the rate of degradation of the one or more segments of road 32 and 48 over a pre-determined period of time t. This will enable the one or more concrete and asphalt companies 74 to determine the durability and/or performance of road materials used in the one or more segments of road 32 and 48. As illustrated in FIG. 6 of the disclosure, once the one or more segments of road 32 and 48 reach a pre-determined road degradation threshold 76, the one or more segments of road 32 and 48 are in immediate need of repair. The longer the amount of time t it takes said one or more segments of road 32 and 48 to reach said pre-determined road degradation threshold 76 from the time they are laid, the more durable the road materials used on that particular stretch of road are compared to other road materials used on similar segments of road. This information can be used by the one or more concrete and/or asphalt companies 74 to determine which types of road materials work best in which geographic locations.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A method of providing road and vehicle diagnostics, comprising the steps of:
    providing a vehicle axle system having a first axle half shaft housing, a second axle half shaft housing and a differential housing;
    attaching one or more tri-axis accelerometers to an outer surface of said first axle housing, said second axle housing and/or said differential housing;
    collecting data from said one or more tri-axis accelerometers in an x-direction, a y-direction and/or a Z-direction;
    providing one or more data processors, wherein said one or more data processors are in communication with said one or more tri-axis accelerometers, wherein said one or more data processors are operably configured to receive said data collected from said one or more tri-axis accelerometers and analyze said data from said one or more tri-axis accelerometers;
    identifying one or more road events, wherein said one or more road events are identified by one or more spikes in said Z-direction of said data collected from said one or more tri-axis accelerometers;
    determining a depth and length of said one or more road events identified, wherein said depth of said one or more road events is determined by a magnitude of said positive and negative changes in acceleration of said spike in said Z-direction measured by said one or more tri-axis accelerometers, wherein said length of said one or more road events is determined by an amount of time between two spikes of opposite magnitudes in said Z-direction measured by said one or more tri-axis accelerometers;
    identifying a geographic location for said one or more road events identified; and
    identifying a time for when said one or more road events was identified.

2. The method of providing road and vehicle diagnostics of claim 1, wherein said one or more road events are a pothole, sinkhole, bump, debris and/or crack.

3. The method of providing road and vehicle diagnostics of claim 1, wherein said vehicle axle system is a front axle system, a rear axle system, a forward tandem axle system and/or a rear tandem axle system.

4. The method of providing road and vehicle diagnostics of claim 1, further comprising the steps of:
    communicating said one or more road events identified, said depth of said one or more road events, said length of said one or more road events, said geographic location of said one or more road events and/or said time said one or more road events was identified to a cloud-based server;
    collecting data related to said one or more road events, said depth of said one or more road events, said length of said one or more road events, said geographic location of said one or more road events and/or said time of said one or more road events by said cloud-based server;
    analyzing said data collected related to said one or more road events, said depth of said one or more road events, said length of said one or more road events, said geographic location of said one or more road events and/or said time of said one or more road events by said cloud-based server;
    determining and monitoring changes in depth and/or length of said one or more road events over time by said cloud-based server; and
    accessing said data related to said one or more road events on said cloud-based server by one or more departments of transportation, one or more concrete companies, one or more asphalt companies, one or more vehicle owners and/or one or more vehicle operators.

5. The method of providing road and vehicle diagnostics of claim 4, further comprising the steps of:
    analyzing changes in acceleration in said Z-direction collected from said one or more tri-axis accelerometers by said one or more data processors over a pre-determined amount of time, wherein said changes in acceleration in said Z-direction over said pre-determined amount of time defines one or more segments of road;
    identifying a geographic location for said one or more segments of road; and
    classifying said one or more segments of road based on data relating to frequency and magnitude of said changes in acceleration in said Z-direction over said pre-determined amount of time.

6. The method of providing road and vehicle diagnostics of claim 5, further comprising the steps of:
    communicating said classifications of said one or more segments of road to said cloud-based server;
    analyzing said data collected related to said classifications of said one or more segments of road by said cloud-based server;
    monitoring changes in said classification of said one or more segments of road over time by said cloud-based server; and
    accessing said data analyzed related to said classifications of said one or more segments of road on said cloud-based server by said one or more departments of transportation, said one or more concrete companies, said one or more asphalt companies, said one or more vehicle owners and/or said one or more vehicle operators.

7. The method of providing road and vehicle diagnostics of claim 6, further comprising the steps of:
    analyzing said data collected related to said classifications of said one or more segments of road and/or said data related to said one or more road events by said cloud-based server;
    monitoring an amount of said one or more road events, said change in depth of said one or more road events, said change in length of said one or more road events and/or said change in classification of said one or more segments of road over a pre-determined amount of time for one or more pre-determined segments of road by said cloud-based server;
    determining a rate of degradation for said one or more pre-determined segments of road by said cloud-based server;
    identifying when said one or more pre-determined segments of road reaches a pre-determined road degradation threshold by said cloud-based server;
    determining a durability and/or performance for said one or more pre-determined segments of road by said cloud-based server, wherein said durability and/or performance of said one or more pre-determined segments of road is based on an amount of time from when materials for said one or more pre-determined segments of road are first laid until said one or more pre-determined segments of road reaches said pre-determined road degradation threshold identified; and
    accessing said durability and/or performance of said one or more pre-determined segments of road determined by said one or more concrete companies and/or by said one or more asphalt companies.

8. The method of providing road and vehicle diagnostics of claim 7, further comprising the step of:
utilizing said durability and/or performance of said one or more pre-determined segments of road determined to identify which types of road materials work best in which geographic regions.

9. The method of providing road and vehicle diagnostics of claim 6, further comprising the step of:
utilizing said data analyzed related to said classifications of said one or more segments of road on said cloud-based server to determine which of said one or more segments of road are in need of repair and/or to determine travel routes.

10. The method of providing road and vehicle diagnostics of claim 1, further comprising the steps of:
providing one or more environmental sensors;
providing one or more windshield wiper sensors;
identifying a crash condition, wherein said crash condition is identified by one or more spikes in said X-direction, Y-direction and/or Z-direction of said data collected from said one or more tri-axis accelerometers;
identifying a geographic location for said crash condition identified;
identifying a time for when said crash conditions was identified;
using said one or more environmental sensors to determine an ambient temperature at said time said crash condition is identified;
using said one or more windshield wiper sensors to determine an amount of precipitation at said time and said location where said crash condition was identified;
predicting a cause for said crash condition identified, wherein said prediction is based on said ambient temperature at said time of said crash condition, said location of said crash condition identified, said time said crash condition occurred and/or said amount of precipitation at said time said crash condition was identified;
communicating said cause for said crash condition identified to a cloud-based server; and
accessing said data related to cause for said crash condition identified on said cloud-based server by one or more insurance companies, one or more emergency service personnel, one or more law enforcement agencies, one or more vehicle owners and/or one or more vehicle operators.

11. The method of providing road and vehicle diagnostics of claim 10, further comprising the step of:
utilizing said cause of said crash condition predicted by said one or more insurance companies and said one or more law enforcement agencies to aid in writing crash condition reports.

12. The method of providing road and vehicle diagnostics of claim 1, further comprising the steps of:
identifying one or more traffic conditions, wherein said one or more traffic conditions are identified by a plurality of spikes in said X-direction over a pre-determined amount of time;
identifying a geographic location for said one or more traffic conditions identified;
identifying a time for when said one or more traffic conditions was identified;
communicating said one or more traffic conditions identified, said geographic location of said one or more traffic conditions identified and said time for when said one or more traffic conditions identified to a cloud-based server;
receiving said information relating to said one or more traffic conditions identified, said geographic location of said one or more traffic conditions identified and said time for when said one or more traffic conditions identified by said cloud-based server;
analyzing said data collected related to said one or more traffic conditions identified, said geographic location of said one or more traffic conditions identified and said time for when said one or more traffic conditions identified by said cloud-based server;
determining an amount of said one or more segments of road experiencing said one or more traffic conditions identified; and
accessing said data related to said one or more traffic conditions identified on said cloud-based server by one or more municipalities, one or more vehicle owners and/or one or more vehicle operators.

13. The method of providing road and vehicle diagnostics of claim 12, further comprising the step of:
utilizing said amount of said one or more segments of road experiencing said one or more traffic conditions determined by said one or more municipalities to alter traffic patterns and optimize the flow of traffic within a geographic region.

* * * * *